(12) United States Patent  
Denson

(10) Patent No.: US 9,275,090 B2
(45) Date of Patent: *Mar. 1, 2016

(54) SYSTEM AND METHOD FOR IDENTIFYING NON-EVENT PROFILES

(71) Applicant: Lytx, Inc., San Diego, CA (US)

(72) Inventor: Craig Denson, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,350

(22) Filed: Jun. 30, 2014

(65) Prior Publication Data

US 2014/0317152 A1    Oct. 23, 2014

Related U.S. Application Data

(63) Continuation of application No. 13/736,709, filed on Jan. 8, 2013, now Pat. No. 8,803,695, which is a continuation of application No. 11/467,694, filed on Aug. 28, 2006, now Pat. No. 8,373,567.

(51) Int. Cl.
| | | |
|---|---|---|
| *G08B 23/00* | (2006.01) | |
| *G06F 17/30* | (2006.01) | |
| *G07C 5/00* | (2006.01) | |
| *G07C 5/08* | (2006.01) | |

(52) U.S. Cl.
CPC ......... *G06F 17/30312* (2013.01); *G07C 5/008* (2013.01); *G07C 5/085* (2013.01); *G08B 23/00* (2013.01); *G07C 5/0858* (2013.01)

(58) Field of Classification Search
CPC ...... G07C 5/08; G07C 5/0808; G07C 5/0816; G07C 5/0841; G07C 5/008; G07C 5/085; G08B 23/00; G06F 17/30312
USPC ......... 340/439, 576; 348/148; 701/32.4, 33.4; 434/62
See application file for complete search history.

(56) References Cited

U.S. PATENT DOCUMENTS

| | | | |
|---|---|---|---|
| 5,294,978 A | 3/1994 | Katayama | |
| 5,784,007 A | 7/1998 | Pepper | |
| 5,815,093 A * | 9/1998 | Kikinis | 340/937 |
| 6,252,544 B1 * | 6/2001 | Hoffberg | 342/357.31 |
| 6,405,132 B1 | 6/2002 | Breed et al. | |
| 2001/0005804 A1 * | 6/2001 | Rayner | 701/35 |
| 2003/0144775 A1 * | 7/2003 | Klausner | 701/29 |
| 2004/0153244 A1 * | 8/2004 | Kellum | 701/301 |
| 2005/0060071 A1 * | 3/2005 | Winner | 701/36 |
| 2006/0192658 A1 * | 8/2006 | Yamamura | 348/148 |
| 2007/0035632 A1 * | 2/2007 | Silvernail et al. | 348/148 |
| 2007/0127833 A1 | 6/2007 | Singh | |
| 2007/0135979 A1 * | 6/2007 | Plante | 701/35 |

\* cited by examiner

*Primary Examiner* — Thomas Mullen
(74) *Attorney, Agent, or Firm* — Van Pelt, Yi & James LLP

(57) ABSTRACT

A system for avoidance records comprises an interface and a processor. An interface is configured to receive an abbreviated record associated with a non-event profile identifier. A processor is configured to determine a counter value associated with the non-event profile identifier and, in the event that the counter value is greater than a predetermined threshold, create and store an avoidance record.

17 Claims, 10 Drawing Sheets

SYSTEM AND METHOD FOR IDENTIFYING NON-EVENT PROFILES

CROSS REFERENCE TO OTHER APPLICATIONS

This application is a continuation of co-pending U.S. patent application Ser. No. 13/736,709, now U.S. Pat. No. 8,803,695, entitled SYSTEM AND METHOD FOR IDENTIFYING NON-EVENT PROFILES filed Jan. 8, 2013 which is incorporated herein by reference for all purposes, which is a continuation of U.S. patent application Ser. No. 11/467,694, now U.S. Pat. No. 8,373,567, entitled SYSTEM AND METHOD FOR IDENTIFYING NON-EVENT PROFILES filed Aug. 28, 2006, which is incorporated herein by reference for all purposes.

BACKGROUND OF THE INVENTION

1. Field of the Invention

The present invention generally relates to computer assisted capture of driving events and more specifically relates to streamlining the event capture and review process by identifying driving events that are non-events and thus, do not require review or analysis.

2. Related Art

Conventional systems for identifying risky behavior by fleet drivers are usually cumbersome to manage because of the vast amount of information they collect. Those systems provide such an enormous amount of information because they usually collect more information than is actually required.

In many situations, conventional systems capture more driving information than is necessary. Quite often, event capture devices collect data continuously, and thus, some of the information is captured even though it does not relate to any risky driving behavior at all. For example, the capturing of information may be triggered by an incident that is beyond a driver's control, for example, by a pothole on a road, a railroad crossing, etc., and thus, the collection of the information in such a case is unnecessary.

Also quite often, the same driving event is captured by several event capture devices, and thus, some of the collected information is redundant. For these and several other reasons, the conventional systems usually provide a massive amount of information to be reviewed. Subsequently, the analysis of all collected data is time consuming because it requires identifying which information pertains to non-events and eliminating that information from further review.

Accordingly, what is needed is an efficient system and method for event capture and review that addresses the significant problems in the conventional systems described above.

SUMMARY

Accordingly, a system and method for identifying non-event profiles is provided which determines those driving events that are non-events, stores only a minimal amount of information for non-events and eliminates captured non-events from review and analysis. The non-events are initially identified during operator review. During that review, non-event profiles are created and provided to an event detector for future use in identifying future events matching a previously created non-event profile. For identified non-events, only abbreviated records are created and sent to the evaluation server.

In one aspect, the system for identifying non-event profiles comprises an event detector, an evaluation server, a non-event profile module and an event record module. The event detector is communicatively coupled with a vehicle and is configured to capture driving events, store them and send them to the evaluation server. The evaluation server is communicatively coupled with the vehicle and is configured to receive, evaluate and store driving events (including non-events). The non-event profile module is configured to determine that a driving event is a non-event by comparing driving event data to non-event profiles for non-events. Finally, the event record module is configured to create an event record for any potentially valid driving event and send the event record from the event detector to the evaluation server.

In one aspect, the method for identifying non-event profiles comprises receiving a trigger from a sensing system coupled with an event detector and capturing a driving event at the event detector in response to the trigger. The method further comprises determining that the driving event is a non-event at the event detector, creating an abbreviated record for the non-event and sending the abbreviated record to an evaluation server for storage. The abbreviated record for the non-event can comprise an unique identifier, event time information, a GPS location and trigger force range information.

Other features and advantages of the present invention will become more readily apparent to those of ordinary skill in the art after reviewing the following detailed description and accompanying drawings.

BRIEF DESCRIPTION OF THE DRAWINGS

Various embodiments of the invention are disclosed in the following detailed description and the accompanying drawings.

The details of the present invention, both as to its structure and operation, may be gleaned in part by study of the accompanying drawings, in which like reference numerals refer to like parts, and in which.

DETAILED DESCRIPTION

Figure 1:
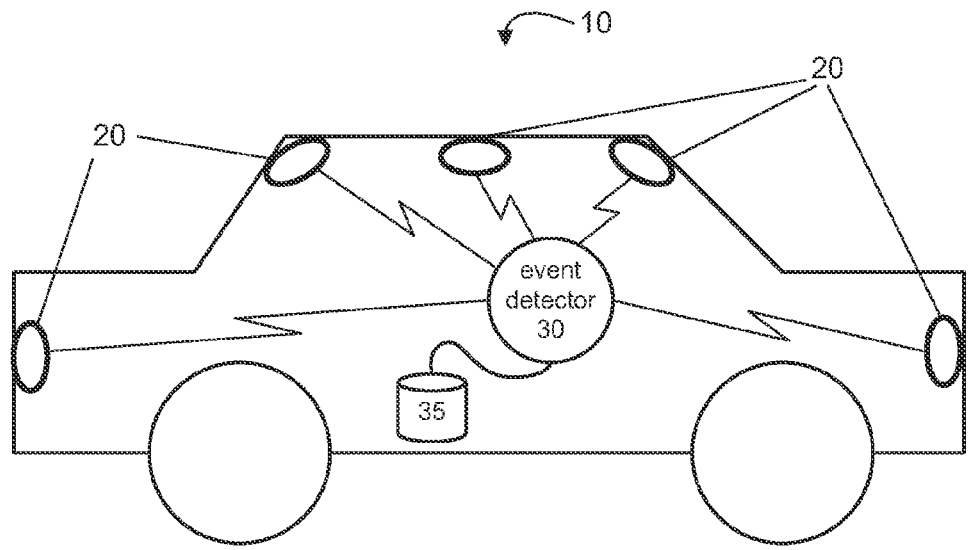
FIG. 1 is a block diagram illustrating an example event detector in control of a plurality of event capture devices deployed in a vehicle according to an embodiment of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Certain embodiments as disclosed herein provide for systems and methods for identifying non-events, creating non-events profiles, storing only a minimal amount of information for non-events and storing detailed information for valid driving events. Valid events are those captured driving events that are essential to the testing of a driver's risky behavior. A driving event can be identified as a non-event if it involves circumstances not essential to the testing of a driver's risky behavior. For example, a driving event is a non-event if it involves instances beyond a driver's control such as driving over a pothole on the road, a railroad crossing, etc. For identified non-events, only abbreviated records are created and sent to the evaluation server. For all other events, full driving event records including audio, video, and other related information are created and stored for future evaluation and analyzing.

After reading this description, it will become apparent to one skilled in the art how to implement the invention in various alternative embodiments and alternative applications. However, although various embodiments of the present invention will be described herein, it is understood that these embodiments are presented by way of example only and not limitation. As such, this detailed description of various alternative embodiments should not be construed to limit the scope or breadth of the present invention as set forth in the appended claims.

FIG. 1 is a block diagram illustrating an example event detector 30 in control of a plurality of event capture devices 20 deployed in a vehicle 10 according to an embodiment of the present invention. In the illustrated embodiment, the event detector 30 is integrated with the vehicle 10 and is communicatively coupled with the event capture devices 20. The event detector 30 is also configured with data storage 35.

The event detector 30 can be any of a variety of types of computing devices with the ability to execute programmed instructions, receive input from various sensors, and communicate with one or more internal or external event capture devices 20 and other external devices (not shown). An example general purpose computing device that may be employed as all or a portion of the event detector 30 is later described with respect to FIG. 11. An example general purpose wireless communication device that may be employed as all or a portion of an event detector 30 is later described with respect to FIG. 10.

When the event detector 30 identifies a driving event particularly of interest for driving analysis purposes, the event detector 30 instructs one or more event capture devices 20 to send "pre-event" data, "during-the-event" data, and "post-event" data to the event detector 30 to be stored in the data storage area 35. Events may comprise a variety of situations, including automobile accidents, reckless driving, rough driving, or any other type of stationary or moving occurrence that the owner of a vehicle 10 may desire to know about.

The vehicle 10 may have a plurality of event capture devices placed in various locations around the vehicle 10. An event capture device 20 may comprise a video camera, still camera, microphone, and other types of data capture devices. For example, the event capture device 20 may include an accelerometer that senses changes in speed or direction. Additional sensors and/or data capture devices may also be incorporated into the event capture device 20 in order to provide a rich set of information about a detected event.

The data storage area 35 can be any sort of internal or external, fixed or removable memory device and may include both persistent and volatile memories. The function of the data storage area 35 is to maintain data for long-term storage and also to provide efficient and fast access to instructions for applications or modules that are executed by the event capture device 30.

In one embodiment, the event detector 30 in combination with one or more event capture devices 20 identifies an event and stores certain audio and video data along with related information about the event. For example, related information may include the speed of the vehicle when the event occurred, the direction the vehicle was traveling, the location of the vehicle (e.g., from a global positioning system ("GPS") sensor), G-force data and other information from sensors located in and around the vehicle or from the vehicle itself (e.g., from a data bus integral to the vehicle such as a J-1850 vehicle bus). This combination of audio, video, and other data is compiled into an event that can be stored in the data storage 35 on board the vehicle for later delivery to an evaluation server.

Figure 2:
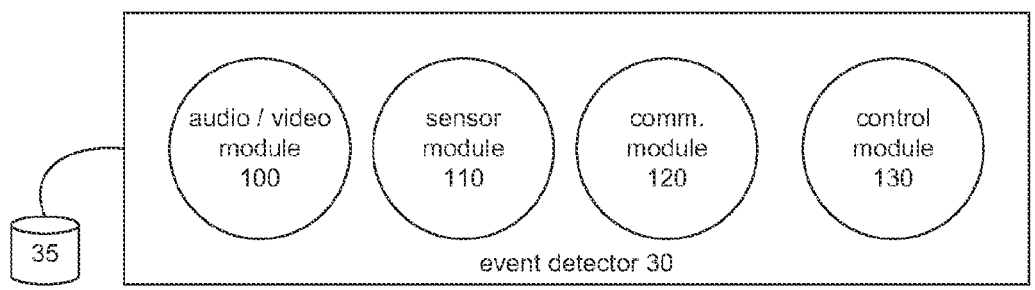
FIG. 2 is a block diagram illustrating an example event detector according to an embodiment of the present invention.

FIG. 2 is a block diagram illustrating an example event detector 30 according to an embodiment of the present invention. In the illustrated embodiment, the event detector 30 comprises an audio/video ("AV") module 100, a sensor module 110, a communication module 120, and a control module 130. Additional modules may also be employed to carry out the various functions of the event detector 30, as will be understood by those having skill in the art.

The AV module 100 is configured to manage the audio and video input from one or more event capture devices and storage of the audio and video input. The sensor module 110 is configured to manage one or more sensors that can be integral to the event detector 20 or external from the event detector 20. For example, an accelerometer may be integral to the event detector 20 or it may be located elsewhere in the vehicle. The sensor module 110 may also manage other types of sensor devices such as a GPS sensor, temperature sensor, moisture sensor, or the like (all not shown).

The communication module 120 is configured to manage communications between the event detector 20 and other devices and modules. For example, the communication module 120 may handle communications between the event detector 30 and the various event capture devices. The communication module 120 may also handle communications between the event detector 20 and a memory device, a docking station, or a server such as an evaluation server. The communication module 120 is configured to communicate with these various types of devices and other types of devices via a direct wire link (e.g., USB cable, firewire cable), a direct wireless link (e.g., infrared, Bluetooth), or a wired or wireless network link such as a local area network ("LAN"), a wide area network ("WAN"), a wireless wide area network ("WWAN"), or an IEEE 802 wireless network such as an IEEE 802.16 ("WiFi") network.

The control module 130 is configured to control the actions of remote devices such as event capture devices. For example, the control module 130 may be configured to receive a trigger from the sensor module 110 indicating a valid event and to instruct the event capture devices to send the event data to the event detector.

Figure 3:
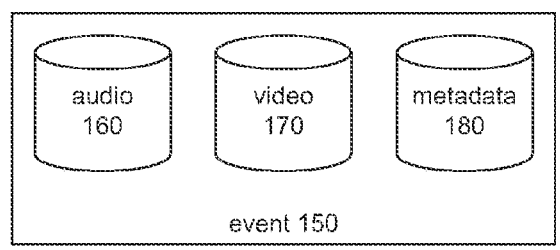
FIG. 3 is a block diagram illustrating an example captured event according to an embodiment of the present invention.

FIG. 3 is a block diagram illustrating the basic data structure of an example event 150 according to an embodiment of the present invention. In the illustrated embodiment, the event 150 comprises audio data 160, video data 170, and metadata 180. Audio data 160 can be collected from inside the vehicle and/or outside the vehicle. Audio data 160 may also include information from an internal vehicle bus about the baseline noise level of the operating vehicle, if such information is available. Additional information about baseline noise level, radio noise level, conversation noise level, or external noise level may also be included in audio data 160.

Video data 170 may include still images or moving video captured by one or more cameras mounted in various locations in and around the vehicle. Video data 170 may include images or video from inside the vehicle, outside the vehicle, or both. In one particularly advantageous embodiment, still images and moving video that illustrate the entire area inside the vehicle and the entire 360 degree area surrounding the vehicle are captured by a plurality of image capture devices and included in video data 170.

Metadata 180 may include a variety of additional information that is available to the event detector 30 at the time of an event. Such additional data may include the velocity and direction of the vehicle, the GPS location of the vehicle, elevation, time, temperature, and vehicle engine and electrical component information captured from an internal vehicle bus, just to name a few. Additional information may also be included such as the number of occupants in the vehicle, whether seatbelts were fastened, whether airbags were deployed, whether evasive maneuvering was attempted as determined by the route of the vehicle prior to the event. As will be understood by those skilled in the art, metadata 180 may include an extremely rich variety of information limited only by the scope and type of information obtained prior to, during, and after an event.

Figure 5:
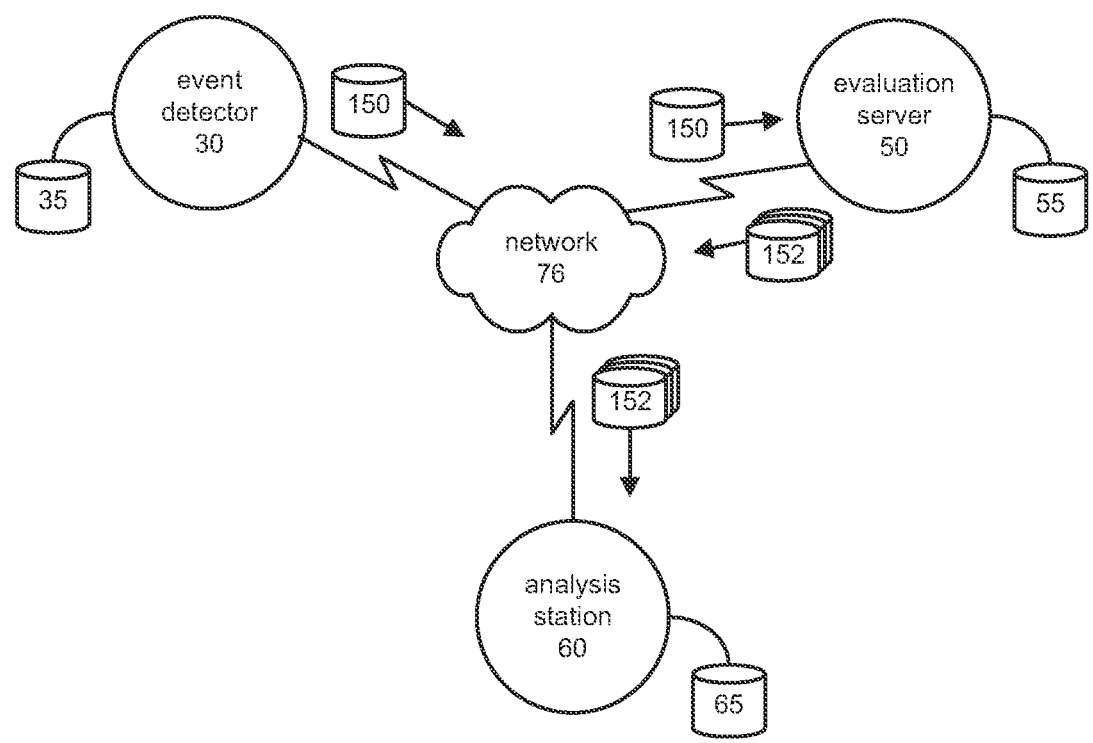
FIG. 5 is a network diagram illustrating an example system for identifying non-event profiles according to an embodiment of the present invention.

FIG. 5 is a network diagram illustrating an example system for identifying non-events according to an embodiment of the present invention and for storing different types of event data depending on whether a captured driving event is a valid driving event requiring further evaluation, or a non-event. In this case, a non-event is an event which was out of the driver's control and did not involve any driver error or risky behavior. In the illustrated embodiment, the system includes an event detector 30, an evaluation server 50, and an analysis station 60. The event detector 30, the evaluation server 50 and the analysis station 60 communicate with each other via a network 76, each of them coupled with a data storage area 35, 55, and 65, respectively. Additional event detectors 30, evaluation servers 50, and analysis stations 60 may also be included. It will be understood that the analysis station 60 may be located at the same site as the evaluation server in alternative embodiments, and may be linked to the evaluation server via a local network or the like in that case.

The function of the event detector 30 is to identify and capture a plurality of events and send data structures representing the audio, video, and other related data (collectively called an "event") to the evaluation server 50. The evaluation server maintains the captured events and provides them to the analysis station 60 where the events are reviewed. The analysis station 60 may be configured with certain hardware and software modules that allow an operator to review and analyze event data (e.g., audio, video, and metadata), create summary reports and the like.

In one embodiment, the event detector 30 is configured to create metadata tags and assign them to a variety of points. A metadata tag correlates to a particular moment in time and can be linked to a corresponding portion of a video and/or audio buffer. For example, for a given event, one metadata tag can be assigned to the beginning of the event and another metadata tag can be assigned to the end of the event.

After an event is reviewed, it may be discarded, flagged for follow up, flagged for inclusion in one or more reports, or otherwise maintained for later reporting or analysis. In one embodiment, certain portions of one or more events may be incorporated into a report and then sent to the evaluation server 50 for storage.

In one embodiment, an event 150 is captured by an event detector 30 and stored until it is provided to the evaluation server 50. The means by which an event 150 can be provided to the evaluation server 50 can vary. For example, an event 150 may be provided from event detector 30 to the evaluation server 50 by way of a portable media device, a direct wire link, a direct wireless link, an indirect wire link, an indirect wireless link, or any combination of these. Event 150 may be secured by encryption of the event data structure and/or a secure channel between the event detector 30 and the evaluation server 50.

For example, a portable media device may include a USB drive, compact disc, thumb drive, media card, or other similar type of device. A direct wire link may include a USB cable, a firewire cable, an RS-232 cable, or the like. A direct wireless link may include an infrared link, a Bluetooth link, or an IEEE 802.11 point-to-point link, just to name a few. An indirect wired link may include a packet switched or circuit switched network connection configured for conveyance of data traffic. An Ethernet network connection is an example of a packet switched indirect wired link and a dial-up modem connection is an example of a circuit switched indirect wired link; both of which may be configured for conveyance of data traffic.

In the illustrated embodiment, the event 150 travels from the event detector 30 to the evaluation server 50 over the network 76. The network 76 may comprise any of a variety of network types and topologies and any combination of such types and topologies. For example, the network 76 may comprise a plurality of networks including private, public, circuit switched, packet switched, personal area networks ("PAN"), local area networks ("LAN"), wide area networks ("WAN"), metropolitan area networks ("MAN"), or any combination of these. The network 76 may also include that particular combination of networks universally known as the Internet.

In one embodiment, the event 150 travels to the wireless network 76 by way of an access point (not shown) and then on to the evaluation server 50 via the wireless network 76. The access point may provide access via many different wireless network protocols as will be well understood by those having skill in the art. The wireless network may be a WWAN or a WiFi network.

The link between the event detector 30 and the access point may be a short range direct link or a wide range direct link. The access point may be a large radio tower device or a small in-home wireless appliance. The wireless network 76 may include over the air segments and also wired segments. For example, the last mile segments of wireless network may be over the air, while internal and back end segments may be wired segments. In one embodiment, the wireless network 76 may provide a wireless interface to the event detector 30 and then have a wired interface on the back end to the Internet, which in turn connects to the evaluation server 50.

In one embodiment, an event 150 may be provided from the event detector 30 to a docking station (not shown), then to the network 76, and then to the evaluation server 50. Providing the event 150 from the event detector 30 to the docking station can be accomplished via a variety of means as described above, including portable media, direct wired or wireless link, and indirect wired or wireless link. The event detector 30 may also be physically coupled with the docking station to convey the event 150 from the event detector 30 to the docking station. Once the event 150 is received by the docking station, the event 150 is sent over the network 76 to the evaluation server 50.

The network 76 may be a wired or wireless or a combination of the two. The network 76 may also be private or public in whole or in part and may also include the Internet.

In one embodiment, the evaluation server 50 is configured to save the event data in a data buffer, create groups of events, and concatenate data from a number of data buffers.

In one embodiment, a group of events 152 traveling from the evaluation server 50 can be routed to the analysis station 60. The means by which the group of events 152 can be provided to the analysis station 60 can vary. In various embodiments (or in a single embodiment), the group of events 152 can be provided by the evaluation server 50 to the analysis station 60 via the network 76.

The group of events 152 may be identified, for example, by searching for all events that pertain to a particular driver. This may be accomplished by associating each event at the time it is captured with a particular driver. For example, the driver of a vehicle may have a unique identifier and that unique identifier may be included as part of the metadata for each event that is captured while that driver is operating the vehicle.

Groups of events 152 may also be identified by all events associated with a particular company, a particular shift, a particular supervisor, or other reporting structure or working structure combinations. Such a group of events 152, once provided to the analysis station 60, can then be analyzed by an operator who reviews each event and identifies those events that need to be reported or shown to the driver.

Figure 4A:
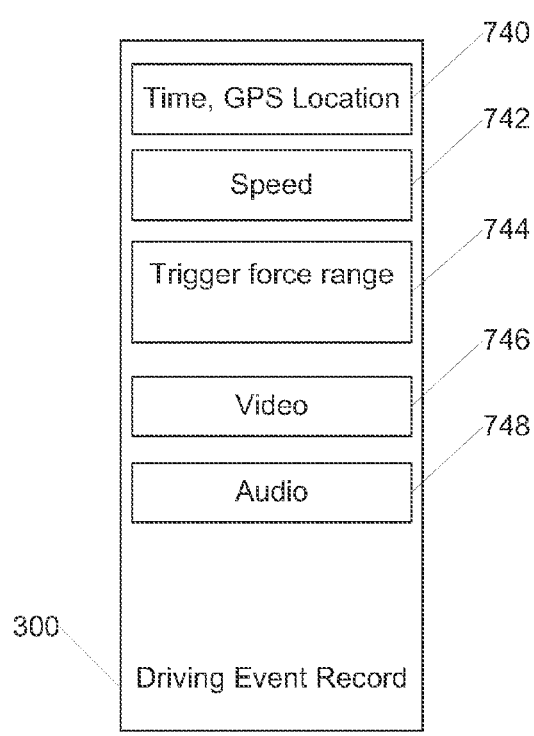
FIG. 4A is a block diagram illustrating an example driving-event record according to an embodiment of the present invention.

FIG. 4A is a block diagram illustrating an example of the data structure of a driving event record 300 according to an embodiment of the present invention. In the illustrated embodiment, the driving event record 300 is created by an event detector 30 when the event detector receives a new event captured by one or more event capture devices which is identified as a potentially valid driving event. Valid events are those captured driving events that are essential to the testing of a driver's risky behavior. If the event is potentially a valid driving event, the event detector stores a substantial amount of information about the event in the driving event record 300, and sends the driving event record to the evaluation server 50 for further review and data analysis. The driving event record 300 may comprise several types of information, including, but not limited to, time and GPS location data 740, speed data 742, trigger force range data 744, video data 746, audio data 748, etc.

Figure 4B:
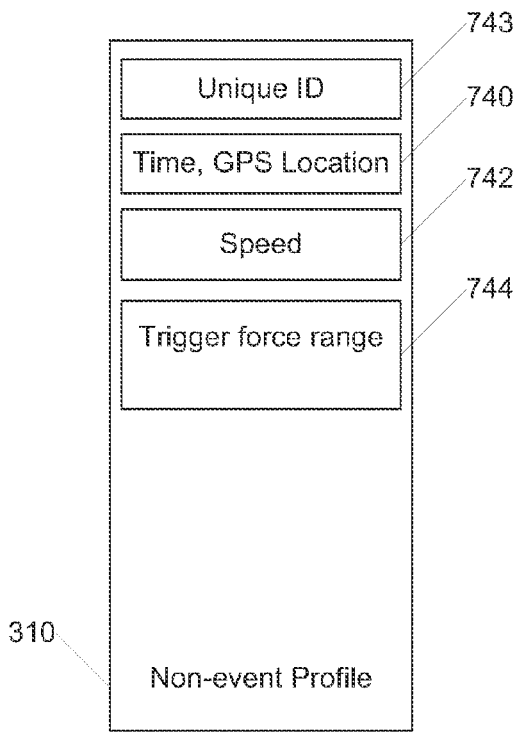
FIG. 4B is a block diagram illustrating an example non-event profile according to an embodiment of the present invention.

FIG. 4B is a block diagram illustrating an example of the data structure of a non-event profile 310 according to an embodiment of the present invention. In the illustrated embodiment, the non-event profile 310 is created at the evaluation server 50 after an operator has identified a driving event as a non-event based on the contents of the driving event record, as described in more detail below in connection with FIGS. 7 and 9B. The non-event profiles are stored on the evaluation server and copies of non-event profiles are sent to the event detectors in the field. A typical non-event profile 310 contains less data than the driving event record 300. The non-event profile should contain just enough information to identify the non-event if it recurs. For example, a non-event profile 710 can comprise a unique identifier 743 created by the evaluation server for that particular non-event, time and GPS location information 740, speed information 742, and trigger force range information 744. In an alternative embodiment, time and/or speed information may be excluded from the non-event profile 710. The unique identifier 743 is used by the event detector to identify and refer to the appropriate non-event profile. After the unique identifier is created for the non-event profile, the evaluation server also creates an occurrence counter. The occurrence counter is used to keep track of future occurrences of non-events having the same non-event profile, as will be described in more detail below.

Figure 4C:
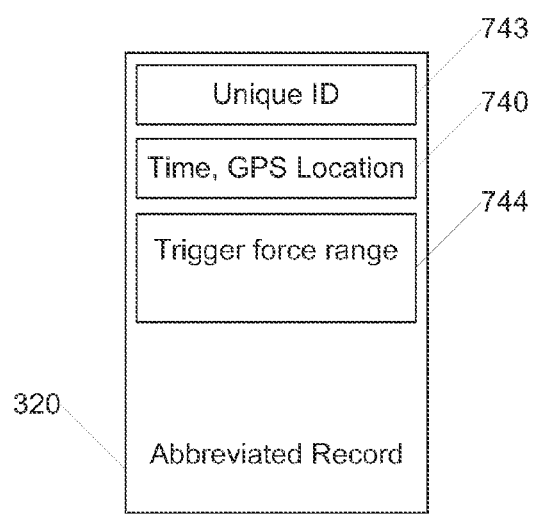
FIG. 4C is a block diagram illustrating an example abbreviated record according to an embodiment of the present invention.

FIG. 4C is a block diagram illustrating an example of the data structure of an abbreviated record 320 according to an embodiment of the present invention. In the illustrated embodiment, the abbreviated records 320 are created by event detectors and sent to the evaluation server. If a captured event has a corresponding non-event profile, very little information about the event needs to be stored. In fact, the amount of information stored in the abbreviated record 320 can be even smaller than in the corresponding non-event profile 310. A typical abbreviated record 320 may comprise a unique identifier 743, time and GPS location information 740, and trigger force range information 744, although even less information than this may be required in other embodiments. The unique identifier assigned to the abbreviated record is the same as the unique identifier assigned to the corresponding non-event profile. The unique identifier 743 is used to identify and refer to the appropriate non-event profile.

Figure 4D:
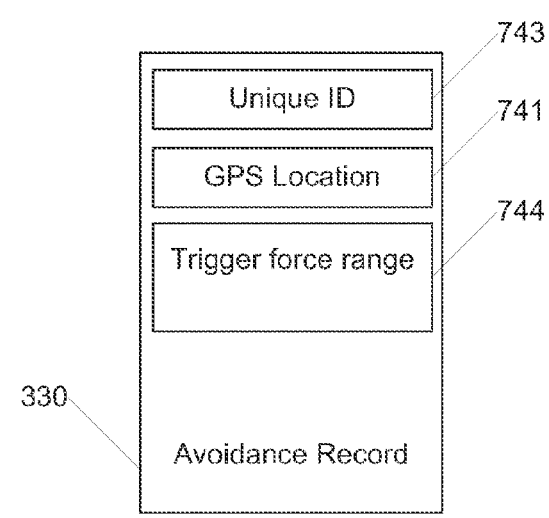
FIG. 4D is a block diagram illustrating an example avoidance record according to an embodiment of the present invention.

FIG. 4D is a block diagram illustrating an example of the data structure of an avoidance record 330 according to an embodiment of the present invention. In the illustrated embodiment, the avoidance record 330 is created at an evaluation server when the evaluation server receives an abbreviated record for a particular identified non-event a specified number of times. If an event has a corresponding non-event profile and it has been captured a specified number of times, the evaluation server determines that the event which has that non-event profile should be avoided by drivers in the future. To facilitate that, the avoidance record 330 is created.

The avoidance records 330 are stored on the evaluation server. The amount of information stored in the avoidance record 330 can be even smaller than in the corresponding abbreviated record 320. A typical avoidance record 330 comprises a unique identifier 743, GPS location information 741, and trigger force range information 744. The unique identifier 743 is used to identify and refer to the appropriate non-event profile.

Operation of the event detector and evaluation server in identifying and handling non-events will now be described in more detail with reference to FIGS. 6 to 9. In the illustrated embodiment, captured events are provided to the event detector in response to detection of a trigger, which may be a force above a certain threshold, for example. Other triggers may be used to trigger transmission of captured events to the event detector in alternative embodiments. The event detector compares received events 150 to previously stored non-event profiles, creates a full driving event record 300 (FIG. 4A) if the event data does not match any stored non-event profile, and creates an abbreviated record 320 (FIG. 4C) if the event data matches a stored non-event profile. The evaluation server or analysis station receives driving event records and abbreviated records from the event detector, and determines whether the driving event records match the criteria for a valid driving event. If not, a new non-event profile 310 (FIG. 4B) is created and sent to all event detectors 30. If the same identified non-event occurs more than a predetermined number of times, avoidance record 330 is created.

Figure 6A:
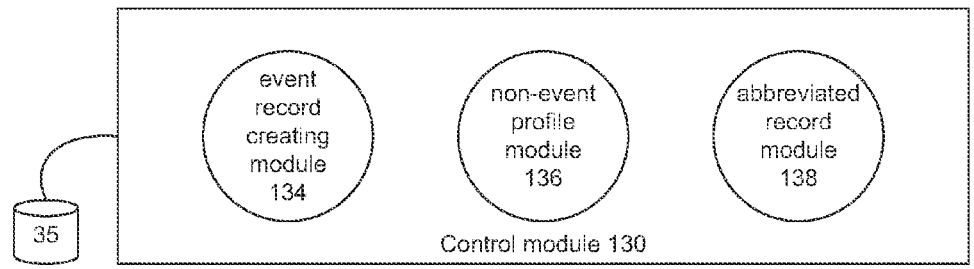
FIG. 6A is a block diagram illustrating an example control module according to an embodiment of the present invention.

FIG. 6A is a block diagram illustrating an example control module 130 residing in the event detector according to an embodiment of the present invention. In the illustrated embodiment, the control module 130 comprises an event record creating module 134, a non-event profile module 136 and an abbreviated record module 138. The non-event profile module 136 is configured to compare captured event data with previously stored non-event profiles. Non-event profiles are created by the evaluation server for those events that are irrelevant to the analysis of driving behavior and thus, require storing only a minimal amount information, and are stored by the event detectors for later comparison purposes. It will be understood that the evaluation server may alternatively be responsible for comparing captured event data with previously identified non-event profiles, and for creating abbreviated records 320 if appropriate.

Storage of unnecessary and/or redundant information may be expensive. But, even if the cost of data storage is not an issue, the processing of data containing both relevant and irrelevant information may be time consuming. To save data storage space and shorten data processing time, detailed information about the event is stored only if the event is a valid driving event. Driving events that are actually non-events require storing only a minimal amount of information. If a captured event may be a valid driving event, a full detailed event record is created, whereas for an identified non-event only some information about the event is saved.

In one embodiment, when the event detector receives captured event data, it identifies some information about the event, such as GPS location information of the vehicle at the time of the event, speed information, trigger signal information, and the like. The non-event profile module 136 then compares that information to the information saved in non-event profiles stored at data storage 35. If the received event data matches information saved in any of the non-event profiles, the received event may be categorized as a non-event.

If the non-event profile module 136 determines that the received event matches a previously stored non-event profile, the abbreviated record module 138 creates an abbreviated record 320 (FIG. 4C) for that non-event and sends the abbreviated record to the evaluation server. But, if the non-event profile module 136 determines that the received event does not match any previously stored non-event profiles, and is therefore potentially a valid driving event, the event record creating module 134 creates a full driving event record 300 (FIG. 4A) for that event and sends it to the evaluation server.

Figure 6B:
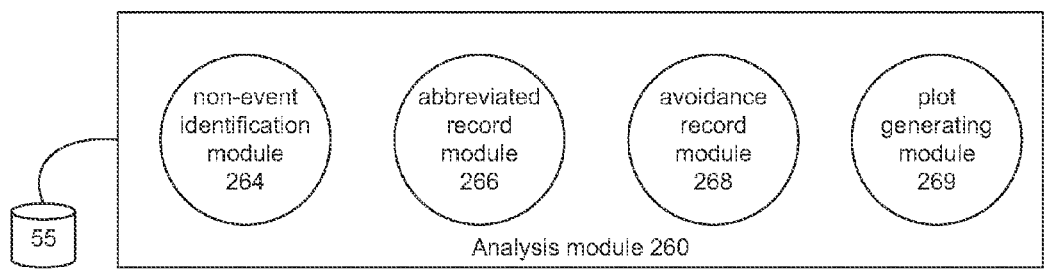
FIG. 6B is a block diagram illustrating an example analysis module according to an embodiment of the present invention.

FIG. 6B is a block diagram illustrating an example analysis module 260 at an evaluation server according to an embodiment of the present invention. In the illustrated embodiment, the analysis module 260 comprises a non-event identification module 264, an abbreviated record module 266, an avoidance record module 268 and a plot generating module 269. The analysis module 260 is configured to identify non-events and to create a variety of records, including non-event profiles and avoidance records.

The main function of the non-event identification module 264 is to identify non-events and to create non-event profiles 310 for non-events. An event may be identified as a non-event if the event data are irrelevant to the analysis of driving behavior. For example, an event may be a non-event if the event was related to the driving over a physical obstacle at a known location, such as driving over a pothole, a railroad crossing, etc., and the analysis does not focus on the driving over those obstacles. A non-event may be identified by checking if the event data contains a negative trigger force value along the "Z" axis. Such an event may represent a situation where the vehicle suddenly hit a pothole or ran over a railroad crossing.

In one embodiment, an operator identifies which events are non-events, flags those events as non-events and initiates the creating of non-event profiles with a unique identifier 743 associated with each non-event profile so that the later occurrence of the same set of data can be associated with the same unique identifier in a corresponding abbreviated record. The non-event identification module 264 creates non-event profiles for non-events, stores one copy of the non-event profiles in data storage 55 at the evaluation server and sends other copies of the non-event profiles to all event detectors in the system, or to those operating in an area which covers the location of the identified non-event.

An abbreviated record module 266 receives abbreviated records 320 for non events from event detectors, and maintains a non-event occurrence-counter associated with each non-event profile. Once the abbreviated record is received at the evaluation server, the abbreviated record module 266 advances a non-event occurrence-counter for the unique identifier associated with the abbreviated record, and determines whether that specific abbreviated record has been received at the evaluation server more than a predetermined number of times. If, so, the abbreviated record module 266 sends a signal to the avoidance record module 268.

In one embodiment, the main function of the avoidance record module 268 is to create avoidance records 330 (FIG. 4D) for non-events. If a non-event was repeated certain number of times, the avoidance record module 268 creates an avoidance record 330 for that non-event and sends the avoidance record to event detectors.

The avoidance record module 268 can be invoked if a given non-event has been identified more than a predetermined number of times. An avoidance record is usually very short and contains a minimum amount of information about the non-event.

In one embodiment, the plot generating module 269 receives requests from an operator to produce data plots. After receiving the request, the plot generating module 269 analyzes the appropriate event records stored at the evaluation server and creates the requested plots using the data stored at the evaluation server. The plots may contain statistical information about valid-driving events, non-events, abbreviated records, avoidance records, etc. The plots may also represent a special relationship between non-events and a specified driving course or a specified location. Furthermore, the plots may represent statistical information about driving behavior of one driver or a group of drivers. A variety of other plots are also contemplated.

Figure 6C:
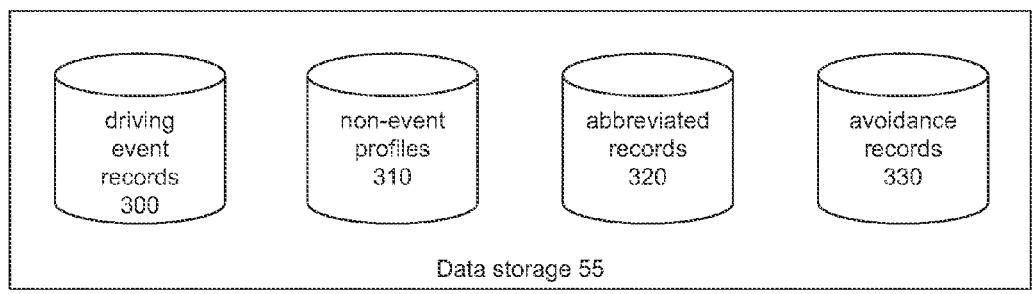
FIG. 6C is a block diagram illustrating an example data storage module according to an embodiment of the present invention;\

FIG. 6C is a block diagram illustrating an example evaluation server data storage 55 according to an embodiment of the present invention. In the illustrated embodiment, the data storage 55 comprises databases containing stored driving event records 300, non event profiles 310, abbreviated records 320 and avoidance records 330.

Figure 7:
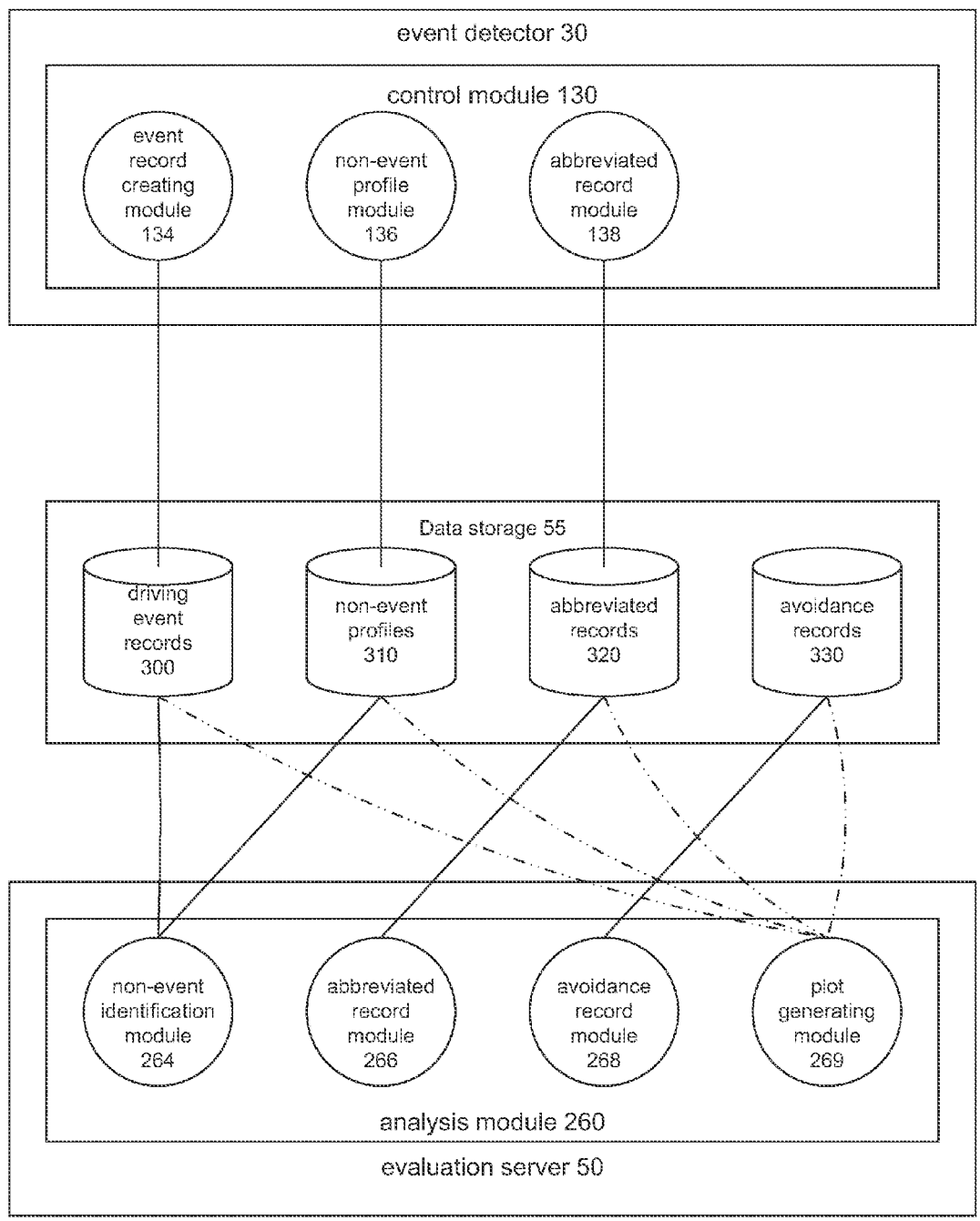
FIG. 7 is a block diagram illustrating an example event detector and an example evaluation server processing events according to an embodiment of the present invention.

FIG. 7 is a block diagram illustrating an example event detector 30 and an example evaluation server 50 processing captured events according to an embodiment of the present invention.

In one embodiment, potentially valid driving event records 300 are sent from the event detector 30 to the non-event identification module 264 of the evaluation server 50 and then stored at data storage 55 if they are identified as valid events. The non-event identification module 264 can provide driving event records 300 received from event detectors in the field to an operator, who reviews the records and determines whether any of the records should be identified as a non-event. As described above in connection with FIG. 6A, non-events are driving events that are irrelevant to the testing of driving behaviors. Such circumstances may include driving through physical obstacles at known locations such as potholes, railroad crossings, and the like, if driving over those obstacles is irrelevant to the testing.

If the non-event identification module determines that the received event record corresponds to a valid driving event requiring further study, the record is sent to the driving event records section of the data storage module 55. If the event is identified as a non-event, the operator initiates the creating of a non-event profile 310 for the non-event. A non-event profile 310 contains a smaller amount of information than the driving event record 300, as described above, but it contains just enough information to identify the non-event and flag a recurrence of the non-event in the future. One of the fields in a non-event profile 310 comprises a unique identifier which can be used by the evaluation server 50 to keep track of similar non-events captured in the future. The non-event profiles 310 are stored in the non-event profile section of the data storage module 55 at the evaluation server 50. Copies of non-event profiles 310 are also sent to event detectors and stored in the data storage modules 35 of event detectors in the field.

The event detectors 30 access non-event profiles in their data storage modules 35 to determine whether a newly captured event is a non-event. When the event detector 30 receives a new event, it passes the new event data to its non-event profile module 136. The non-event profile module 136 compares the new event data (including GPS location information, speed information, trigger signal information, and the like) to the stored non-event profiles 310 to determine if the detected event matches a previously stored non-event profile. If the parameters in the new event data match the parameters in any of the previously stored non-event profiles, the non-event profile module 136 determines that the event is a non-event and thus, needs only an abbreviated record 320. But, if the non-event profile module 136 does not find a "match" among the non-event profiles 310, the event is potentially a valid driving event and a full driving event record 300 is created by module 134 and sent to the evaluation server at the appropriate time.

In one embodiment, the abbreviated record module 138 creates abbreviated records 320 for non-events. The abbreviated records 320 are created to save system storage space and thus, improve efficiency of the review process. An abbreviated record 320 contains a smaller amount of information than the corresponding driving event record 300, and also contains the same unique identifier 743 as the non-event profile 310 matching the new driving event as identified by the non event profile matching module 136. Once an abbreviated record 320 for the non-event is created, the event detector 30 sends the abbreviated record 320 to the evaluation server 50. In the illustrated embodiment, abbreviated records are stored by the evaluation server 50 in the corresponding section of the data storage module 55, and are also monitored by the abbreviated record module 266.

In one embodiment, the abbreviated record module 266 residing in the evaluation server 50 monitors the receiving of each abbreviated record 320. The abbreviated record module 266 counts how many times the same non-event has recurred, i.e. it counts the number of times an abbreviated record with the same unique identifier 743 is received. If the non-event recurs a specified number of times, the analysis module 260 invokes the avoidance record module 268. The avoidance record module 268 creates an avoidance record 330 for that non-event, which is stored in the corresponding area of data storage module 55.

In one embodiment, the plot generating module 269 generates a variety of plots based on the collected driving event data. The plots may contain statistical information about valid driving events, non-events, abbreviated records, avoidance records, and the like. The plots may also represent a special relationship between non-events and a specified driving course or a specified location. Furthermore, the plots may represent statistical information about driving behavior of one driver or a group of drivers. A variety of other plots are also contemplated.

Figure 8:
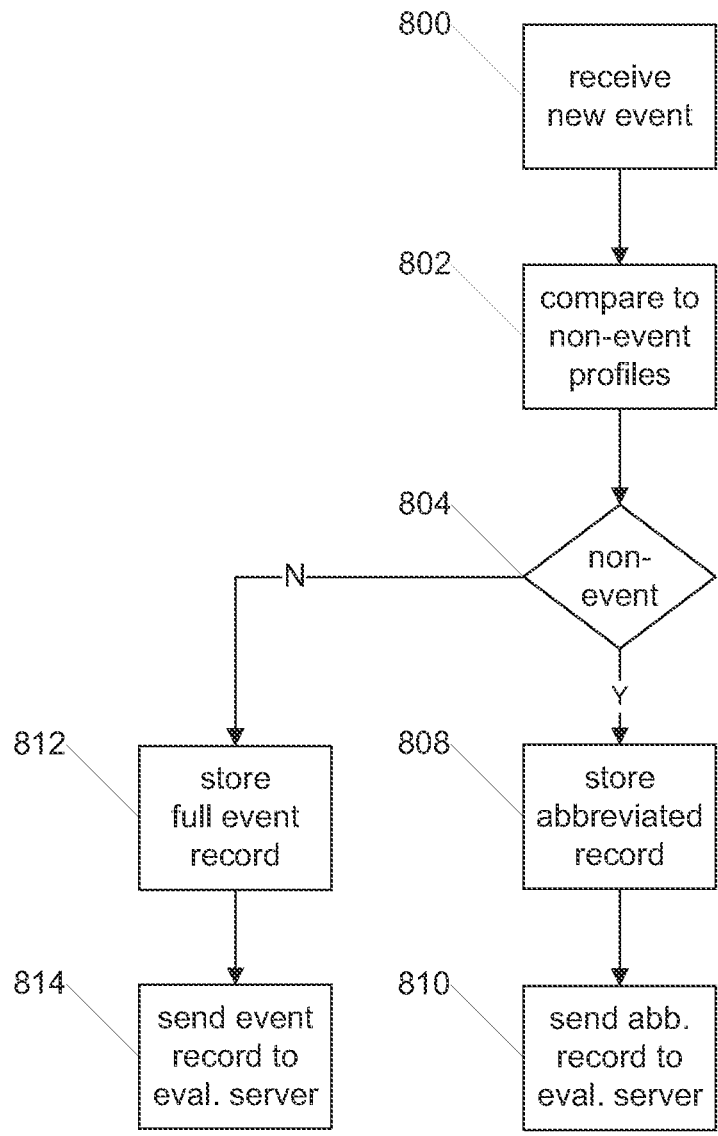
FIG. 8 is a flow diagram illustrating an example process for the detection of non-events by an event detector according to an embodiment of the present invention.

FIG. 8 is a flow diagram illustrating an example process for the identification and processing of captured events by an event detector according to an embodiment of the present invention. In the illustrated embodiment, the event detector receives an event from one or more event capture devices, determines whether the captured event is potentially a valid-driving event or matches a previously stored non-event profile, and creates appropriate data records.

At a step 800, the event detector receives new event data from an event capture device (or more than one such device). As described above in connection with FIG. 3, event capture devices may comprise audio, video and/or metadata sensing devices. Once the event detector receives an event trigger, the event detector selects one or more event capture devices, and passes the trigger to selected event capture devices. In response, each selected event capture device sends captured event data to the event detector.

At a step 802, the event detector compares the event data received from the event capture devices (e.g., GPS location information, speed information, trigger signal information, etc.) to the previously stored non-event profiles to determine whether the received event is a non-event.

At a step 804, the event detector checks if the received event corresponds to a previously stored non-event profile. If it does, then the event detector stores only a minimal amount of information for the event, along with the unique identifier 743 of the corresponding non-event profile 310. But, if the received event does not correspond to the data in any previously stored non-event profile, the event is identified as a potentially valid driving event and thus, the event detector stores a full driving event record 300 (FIG. 4A) for the event (step 812).

At a step 808, the event detector creates and stores an abbreviated record for any received event corresponding to a non-event profile. Since the received event is a non-event (i.e., the event is not a valid-driving event), there is no need to store full driving event data for it. Thus a shorter, abbreviated record is sufficient for the received non-event. As described above in connection with FIG. 4C, a typical abbreviated record comprises a unique identifier 743 which is the same as the unique identifier of the non-event profile identified as matching that event, time and GPS location information 740, and trigger force range information 744. The unique identifier is used to identity and refer to future occurrences of the same non-event.

At a step 810, the event detector sends the abbreviated record to the evaluation server where the abbreviated record is stored and used in further data processing.

At the step 812, the event detector creates a full driving event record 300 for a received event which does not have data matching a previously stored non event profile 310. As described above in connection with FIG. 4A, a typical driving event record 300 comprises detailed information about the event, including time and GPS location data, speed data, trigger force range data, video data, audio data, etc.

At a step 814, the event detector sends the full driving record 300 to the evaluation server where the driving record is stored and used in further data processing.

Figure 9A:
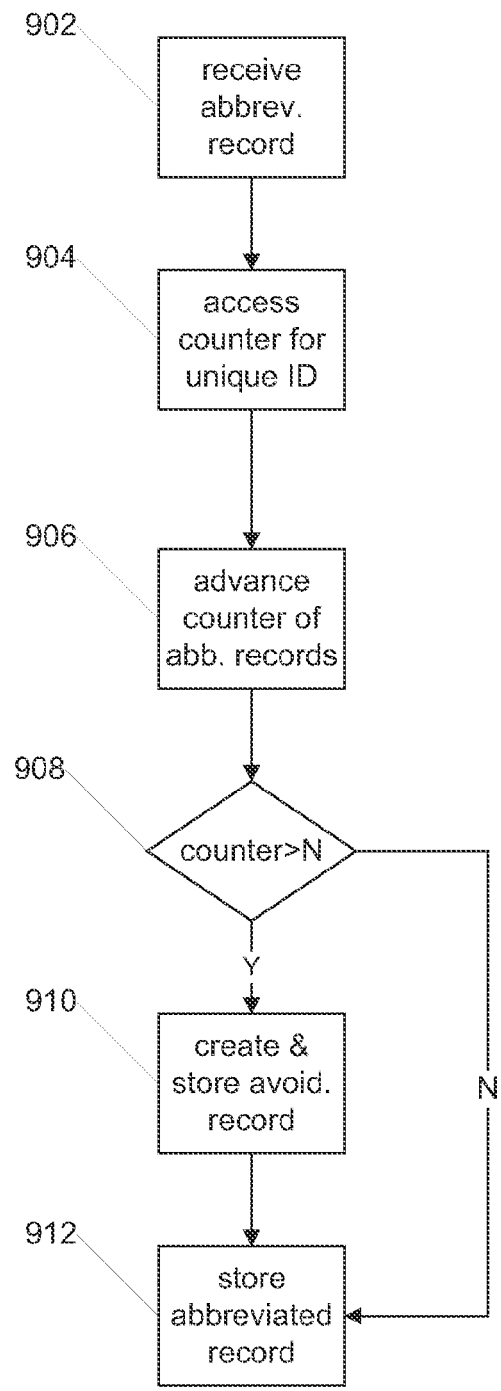
FIG. 9A is a flow diagram illustrating an example process for the identification and processing of abbreviated records by an evaluation server according to an embodiment of the present invention.

FIG. 9A is a flow diagram illustrating an example process for the identification and processing of abbreviated records by an evaluation server according to an embodiment of the present invention. In the illustrated embodiment, the evaluation server receives abbreviated records for non-events and creates additional data records for the non-event if it is needed.

At a step 902, the evaluation server receives an abbreviated record from the event detector. As described above in connection with FIG. 8, the event detector creates abbreviated records for those driving events that correspond to previously identified non-events. Each abbreviated record has a unique identifier which corresponds to the unique identifier included with the non-event profile for the non-event.

At a step 904, the evaluation server retrieves from its database an occurrence counter that has the same unique identifier as the unique identifier included in the abbreviated record. The evaluation server maintains an occurrence-counter for each non-event profile. An occurrence-counter is used to keep track of the number of occurrences of non-events that have the same non-event profile. Each time the non-event having a corresponding non-event profile is captured, the occurrence-counter is advanced until it reaches a predefined maximum number of occurrences for the non-event.

At a step 906, the evaluation server advances the occurrence-counter for the abbreviated record having the same unique identifier as the occurrence-counter.

At a step 908, the evaluation server checks whether the evaluation server has received more than "N" abbreviated records for a given non-event having the same unique identifier 743. If not, the abbreviated record is stored (step 912). If the non-event occurrence-counter has received more than N occurrences for the same unique non event identifier, the evaluation server determines that this non-event has to be "avoided" in the future.

At a step 910, the evaluation server has determined that there have been more than "N" abbreviated records for a given non-event. At the step 910, the evaluation server creates and stores an avoidance record 330 containing minimum information about the non-event.

As described above in connection with FIG. 4D, a typical avoidance record 330 comprises the unique identifier for that non-event, GPS location information, and trigger force range information. The unique identifier assigned to the avoidance record is the same as the unique identifier assigned to the abbreviated record and the corresponding non-event profile. At step 912, the evaluation server stores the received abbreviated record.

In one embodiment, the evaluation server checks periodically to determine whether an operator has sent information that the non-event had expired (not shown in FIG. 9A). A non-event expires, for example, when the pothole is repaired, the obstacle on the road is removed, a specified amount of time has passed since a non-event profile was created for the non-event involving given obstacle, or the like. The information about an expired non-event can be entered by an operator who works at the evaluation server. Alternatively, the evaluation server can periodically check the time-stamp information saved in the non-event profiles. Event detectors 30 may also be instructed to remove the corresponding non-event profile from their records.

If a non-event has expired, collecting further information about the non-event is unnecessary. Thus, in that situation, the evaluation server can remove the appropriate non-event profile, appropriate abbreviated records and all other records related to the expired non-event.

In one embodiment, the evaluation server checks periodically whether an operator had requested plotting of data (not shown in FIG. 9A). An operator can send a request during the driving experiment ("on-line processing") or during data analysis ("off-line post-processing"). As described above in connection with FIG. 6B, the evaluation server in one embodiment includes a plot generating module. The plot generating module analyzes the records stored on the evaluation server and, using that data, creates plots requested by an operator. The plots may contain statistical information about the number of valid-driving events, non-events, abbreviated records for given non-events, number of avoidance records, etc. In addition, the plots may represent a special relationship between non-events identified during a specified driving course or location. The plots may also represent statistical information about driving behavior of one driver, or a group of drivers.

Figure 9B:
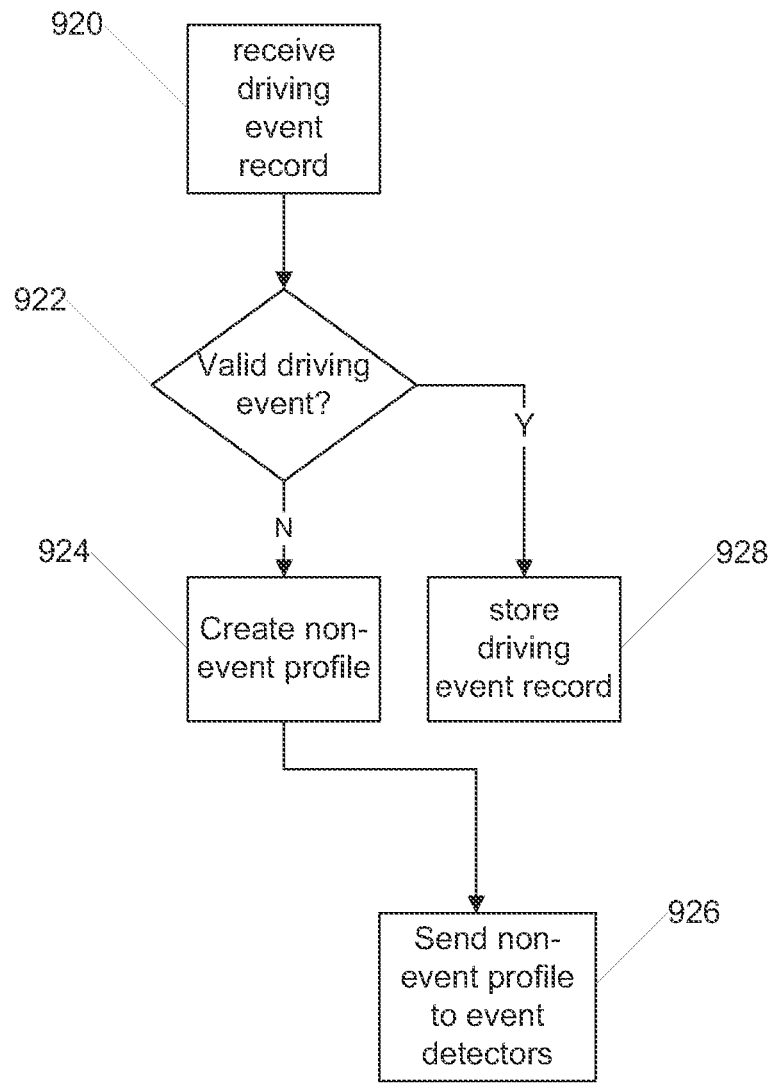
FIG. 9B is a flow diagram illustrating an example process for the identification and processing of driving event records by an evaluation server according to an embodiment of the present invention.

FIG. 9B is a flow diagram illustrating an example process for the identification and processing of driving event records by an evaluation server according to an embodiment of the present invention. In the illustrated embodiment, the evaluation server receives driving event records for potentially valid driving events and creates additional data records for the event if it is needed.

At a step 920, the evaluation server receives a full driving event record from the event detector. As described above in connection with FIG. 8, the event detector creates full driving records for those driving events that are potentially valid driving events (i.e., that are not identical to previously identified non-events). The evaluation server receives the full driving records from the event detector after the event detector receives the data from the selected event capture device or devices.

At a step 922, the evaluation server determines whether the data corresponds to a valid driving event or may be an actual non-event. As described above in connection with FIG. 8, non-events are driving events that are connected to events that are irrelevant to the testing of driving behaviors. Examples of such irrelevant events include driving over physical obstacles at known driving locations, such as driving over potholes, railroad crossings, and the like Such irrelevant events do not require storing full driving event records. For such irrelevant events only a minimal amount of information needs to be stored. The operator determines whether the event is a non-event by examining the data associated with the event. If the event is a valid driving event, the driving event record is stored (step 928) and may be used in subsequent analysis of driver behavior.

If the evaluation server determines that the event was actually a non-event, a non-event profile is created (step 924) and the non-event profile is sent to event detectors in the field (step 926).

In the embodiment described above, non-events are initially identified by examining event data during operator review at the evaluation server and a non-event profile is created for each non-event and provided to the event detectors for future use, The event detector may identify an event corresponding to a non-event profile by comparison of the GPS information, trigger force, and the like, and create a corresponding abbreviated event record for use in counting the number of times that particular event has occurred. Recurring events may be flagged through cumulative identification, for example by using the occurrence counter as described above. Information on such recurring non-events can be provided to government entities and the like to locate and identify necessary road repairs.

Figure 10:
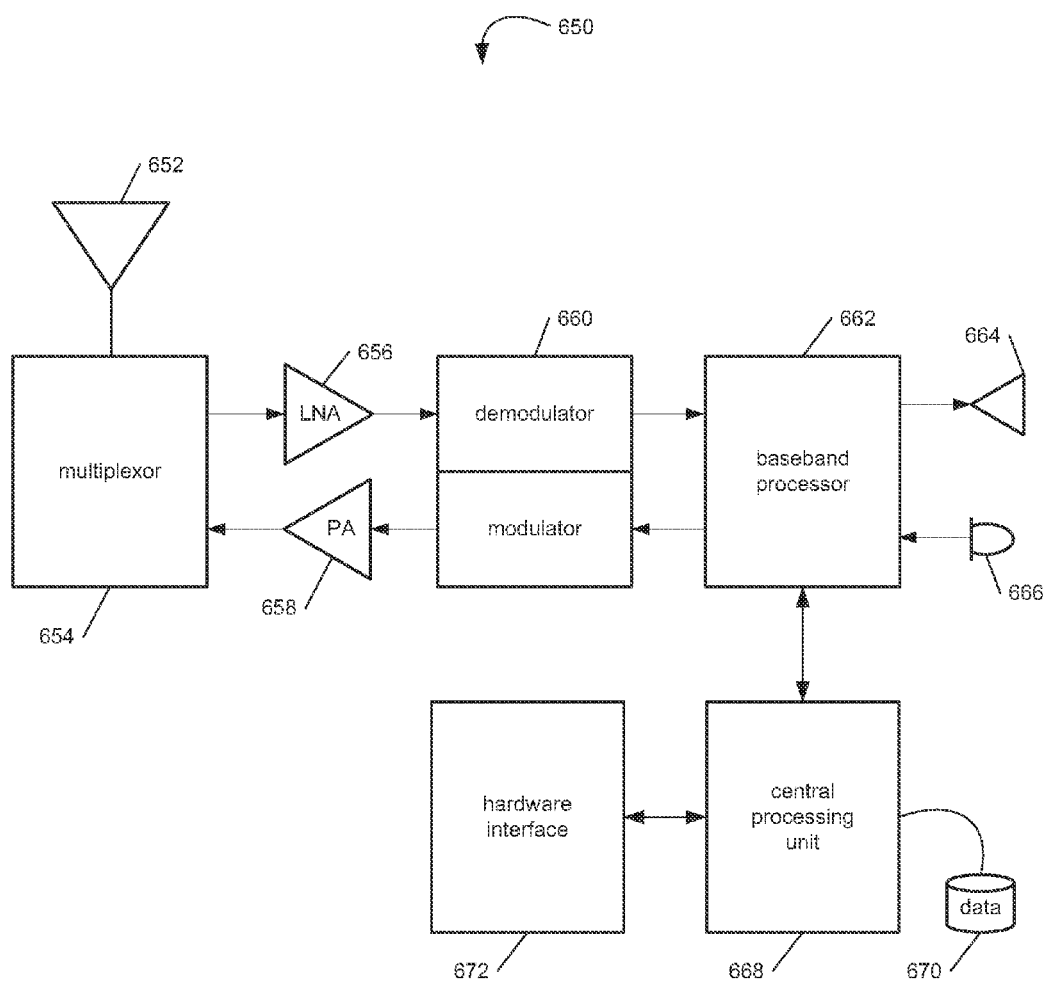
FIG. 10 is a block diagram illustrating an exemplary wireless communication device that may be used in connection with the various embodiments described herein.

FIG. 10 is a block diagram illustrating an exemplary wireless communication device 650 that may be used in connection with the various embodiments described herein. For example, the wireless communication device 650 may be used in conjunction with an event detector or an evaluation server previously described with respect to FIG. 3. However, other wireless communication devices and/or architectures may also be used, as will be clear to those skilled in the art.

In the illustrated embodiment, wireless communication device 650 comprises an antenna 652, a multiplexor 654, a low noise amplifier ("LNA") 656, a power amplifier ("PA") 658, a modulation circuit 660, a baseband processor 662, a speaker 664, a microphone 666, a central processing unit ("CPU") 668, a data storage area 670, and a hardware interface 672. In the wireless communication device 650, radio frequency ("RF") signals are transmitted and received by antenna 652. Multiplexor 654 acts as a switch, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660.

Typically, modulation circuit 660 will combine a demodulator and modulator in one integrated circuit ("IC"). The demodulator and modulator can also be separate components. The demodulator strips away the RF carrier signal, leaving a base-band receive audio signal, which is sent from the demodulator output to the base-band processor 662.

If the base-band receive audio signal contains audio information, then base-band processor 662 decodes the signal and converts it to an analog signal. Then the signal is amplified and sent to the speaker 664. The base-band processor 662 also receives analog audio signals from the microphone 666. These analog audio signals are converted to digital signals and encoded by the base-band processor 662. The base-band processor 662 also codes the digital signals for transmission and generates a base-band transmit audio signal that is routed to the modulator portion of modulation circuit 660. The modulator mixes the base-band transmit audio signal with a RF carrier signal, generating an RF transmit signal that is routed to the power amplifier 658. The power amplifier 658 amplifies the RF transmit signal and routes it to the multiplexor 654 where the signal is switched to the antenna port for transmission by antenna 652.

The baseband processor 662 is also communicatively coupled with the central processing unit 668. The central processing unit 668 has access to a data storage area 670. The central processing unit 668 is preferably configured to execute instructions (i.e., computer programs or software) that can be stored in the data storage area 670. Computer programs can also be received from the baseband processor 662 and stored in the data storage area 670 or executed upon receipt. Such computer programs, when executed, enable the wireless communication device 650 to perform the various functions of the present invention as previously described.

In this description, the term "computer readable medium" is used to refer to any media used to provide executable instructions (e.g., software and computer programs) to the wireless communication device 650 for execution by the central processing unit 668. Examples of these media include the data storage area 670, microphone 666 (via the baseband processor 662), antenna 652 (also via the baseband processor 662), and hardware interface 672. These computer readable mediums are means for providing executable code, programming instructions, and software to the wireless communication device 650. The executable code, programming instructions and software, when executed by the central processing unit 668, preferably cause the central processing unit 668 to perform the inventive features and functions previously described herein.

The central processing unit is also preferably configured to receive notifications from the hardware interface 672 when new devices are detected by the hardware interface. Hardware interface 672 can be a combination electromechanical detector with controlling software that communicates with the CPU 668 and interacts with new devices.

Figure 11:
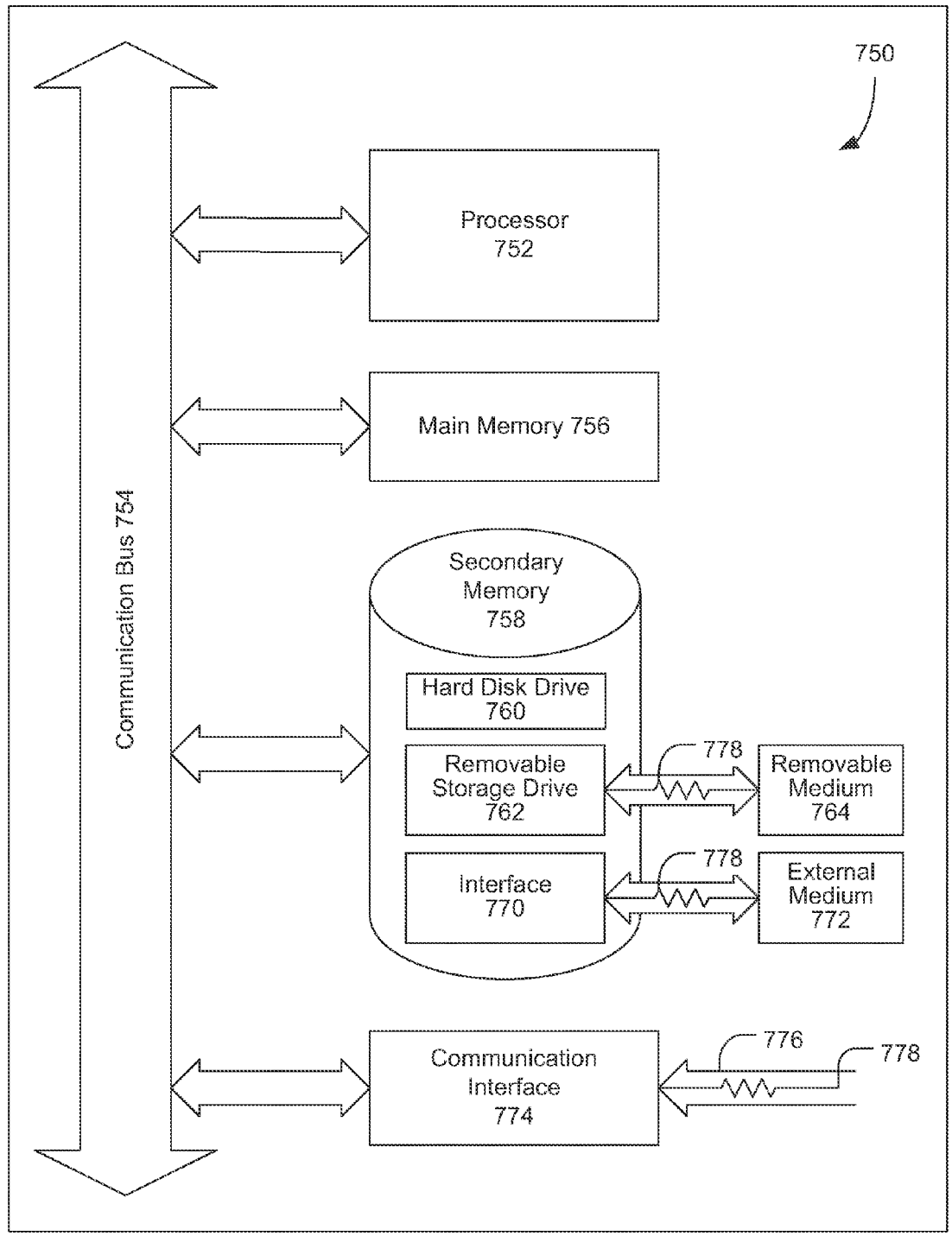
FIG. 11 is a block diagram illustrating an exemplary computer system as may be used in connection with various embodiments described herein.

FIG. 11 is a block diagram illustrating an exemplary computer system 750 that may be used in connection with the various embodiments described herein. For example, the computer system 750 may be used in conjunction with an event detector or an evaluation server previously described with respect to FIG. 3. However, other computer systems and/or architectures may be used, as will be clear to those skilled in the art.

The computer system 750 preferably includes one or more processors, such as processor 752. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 752.

The processor 752 is preferably connected to a communication bus 754. The communication bus 754 may include a data channel for facilitating information transfer between storage and other peripheral components of the computer system 750. The communication bus 754 further may provide a set of signals used for communication with the processor 752, including a data bus, address bus, and control bus (not shown). The communication bus 754 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 750 preferably includes a main memory 756 and may also include a secondary memory 758. The main memory 756 provides storage of instructions and data for programs executing on the processor 752. The main memory 756 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM") and the like, including read only memory ("ROM").

The secondary memory 758 may optionally include a hard disk drive 760 and/or a removable storage drive 762, for example, a floppy disk drive, a magnetic tape drive, a compact disc ("CD") drive, a digital versatile disc ("DVD") drive, etc. The removable storage drive 762 reads from and/or writes to a removable storage medium 764 in a well known manner. Removable storage medium 764 may be, for example, a floppy disk, magnetic tape, CD, DVD, etc.

The removable storage medium 764 is preferably a computer readable medium having stored thereon computer executable code (i.e., software) and/or data. The computer software or data stored on the removable storage medium 764 is read into the computer system 750 as electrical communication signals 778.

In alternative embodiments, secondary memory 758 may include other similar means for allowing computer programs or other data or instructions to be loaded into the computer system 750. Such means may include, for example, an external storage medium 772 and an interface 770. Examples of external storage medium 772 may include an external hard disk drive or an external optical drive and/or external magneto optical drive.

Other examples of secondary memory 758 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 772 and interfaces 770, which allow software and data to be transferred from the removable storage unit 772 to the computer system 750.

Computer system 750 may also include a communication interface 774. The communication interface 774 allows software and data to be transferred between computer system 750 and external devices (e.g., printers), networks, or information sources. For example, computer software or executable code may be transferred to computer system 750 from a network server via communication interface 774. Examples of communication interface 774 include a modem, a network interface card ("NIC"), a communications port, a PCMCIA slot and card, an infrared interface, and an IEEE 1394 fire-wire, just to name a few.

Communication interface 774 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 774 are generally in the form of electrical communication signals 778. These signals 778 are preferably provided to communication interface 774 via a communication channel 776. Communication channel 776 carries signals 778 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 756 and/or the secondary memory 758. Computer programs can also be received via communication interface 774 and stored in the main memory 756 and/or the secondary memory 758. Such computer programs, when executed, enable the computer system 750 to perform the various functions of the present invention as previously described.

In this description, the term "computer readable medium" is used to refer to any media used to provide computer executable code (e.g., software and computer programs) to the computer system 750. Examples of these media include main memory 756, secondary memory 758 (including hard disk drive 760, removable storage medium 764, and external storage medium 772), and any peripheral device communicatively coupled with communication interface 774 (including a network information server or other network device). These computer readable mediums are means for providing executable code, programming instructions, and software to the computer system 750.

In an embodiment that is implemented using software, the software may be stored on a computer readable medium and loaded into computer system 750 by way of removable storage drive 762, interface 770, or communication interface 774. In such an embodiment, the software is loaded into the computer system 750 in the form of electrical communication signals 778. The software, when executed by the processor 752, preferably causes the processor 752 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art.

Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are, therefore, representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for creating avoidance records, comprising:
one or more processors configured to:
receive an abbreviated record associated with event data of a captured vehicle driving event that matches a previously stored non-event profile, wherein the abbreviated record includes an identifier corresponding to the non-event profile;
determine an occurrence counter value associated with the number of times an abbreviated record including the identifier is received; and
in the event that the occurrence counter value is greater than a predetermined threshold, create and store an avoidance record corresponding to the non-event profile; and
a memory coupled with the processor, wherein the memory provides the processor with instructions.

2. The system of claim 1, wherein the one or more processors is further configured to access the occurrence counter value associated with the identifier.

3. The system of claim 2, wherein the one or more processors is further configured to advance the occurrence counter value in the event that the abbreviated record associated with the identifier is received.

4. The system as in claim 1, wherein the created and stored avoidance record includes an avoidance record identifier.

5. The system as in claim 4, wherein the avoidance record identifier is associated with the identifier corresponding to the non-event profile.

6. The system as in claim 1, wherein the created and stored avoidance record includes location information associated with the non-event profile.

7. The system as in claim 6, wherein the location information comprises a location determined using GPS.

8. The system as in claim 1, wherein the created and stored avoidance record includes trigger force range information associated with the captured driving event.

9. A method for creating avoidance records, comprising:
receiving an abbreviated record associated with event data of a captured vehicle driving event that matches a previously stored non-event profile, wherein the abbreviated record includes an identifier corresponding to the non-event profile;
determining, using a processor, an occurrence counter value associated with the number of times an abbreviated record including the identifier is received; and
in the event that the occurrence counter value is greater than a predetermined threshold, creating and storing an avoidance record corresponding to the non-event profile.

10. The method of claim 9, further comprising accessing the occurrence counter value associated with the identifier.

11. The method of claim 10, further comprising advancing the occurrence counter value in the event that the abbreviated record associated with the identifier is received.

12. The method as in claim 9, wherein the created and stored avoidance record includes an avoidance record identifier.

13. The method as in claim 12, wherein the avoidance record identifier is associated with the identifier corresponding to the non-event profile.

14. The method as in claim 9, wherein the created and stored avoidance record includes location information associated with the non-event profile.

15. The method as in claim 14, wherein the location information comprises a location determined using GPS.

16. The method as in claim 9, wherein the created and stored avoidance record includes trigger force range information associated with the captured driving event.

17. A computer program product for creating avoidance records, the computer program product being embodied in a non-transitory computer readable medium and comprising computer instructions for:
   receiving an abbreviated record associated with event data of a captured vehicle driving event that matches a previously stored non-event profile, wherein the abbreviated record includes an identifier corresponding to the non-event profile;
   determining, using a processor, an occurrence counter value associated with the number of times an abbreviated record including the identifier is received; and
   in the event that the occurrence counter value is greater than a predetermined threshold, creating and storing an avoidance record corresponding to the non-event profile.

* * * * *